W. A. MOUTON, A. BARR & W. STROUD.
APPARATUS FOR THE CONVERSION OF MOTION ACCORDING TO ONE LAW INTO MOTION ACCORDING TO ANOTHER LAW.
APPLICATION FILED DEC. 12, 1913.
1,150,785. Patented Aug. 17, 1915.
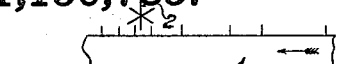
FIG:1.
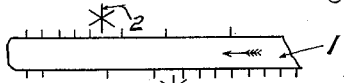
FIG:2.
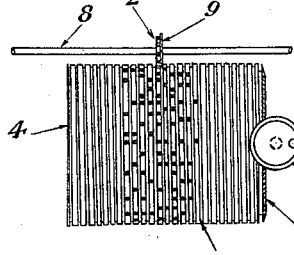
FIG:3.
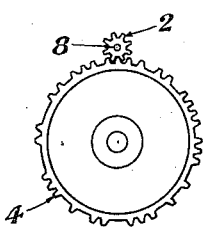
FIG:4.
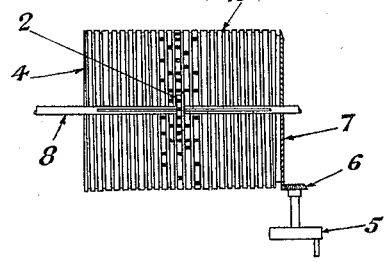
FIG:5.
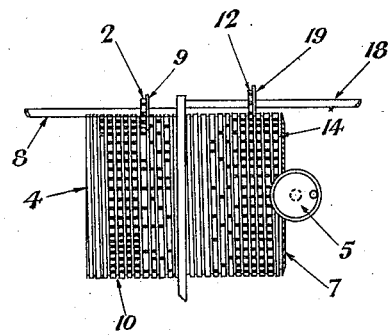
FIG:6.
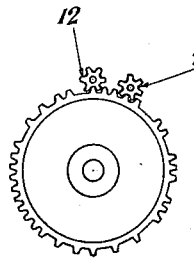
FIG:7.
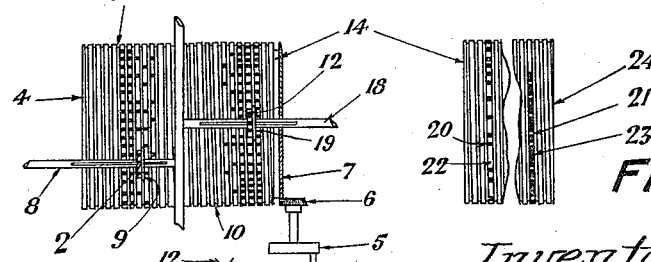
FIG:8. FIG:9. FIG:10. FIG:11.
Inventors.
Willem Anne Mouton.
Archibald Barr.
William Stroud.
by T. Walter Fowler atty.
Witnesses.
G. Manning
C. W. Fowler

UNITED STATES PATENT OFFICE.

WILLEM ANNE MOUTON, OF THE HAGUE, NETHERLANDS, AND ARCHIBALD BARR AND WILLIAM STROUD, OF ANNIESLAND, GLASGOW, SCOTLAND, ASSIGNORS TO BARR AND STROUD, LIMITED, OF ANNIESLAND, GLASGOW, SCOTLAND.

APPARATUS FOR THE CONVERSION OF MOTION ACCORDING TO ONE LAW INTO MOTION ACCORDING TO ANOTHER LAW.

1,150,785. Specification of Letters Patent. Patented Aug. 17, 1915.

Application filed December 12, 1913. Serial No. 806,262.

*To all whom it may concern:*

Be it known that we, WILLEM ANNE MOUTON, a subject of the Queen of the Netherlands, and of Nassau Dillenburgstraat 41, The Hague, Netherlands, and ARCHIBALD BARR and WILLIAM STROUD, subjects of the King of Great Britain and Ireland, and both of Caxton street, Anniesland, Glasgow, Scotland, have invented new and useful Apparatus for the Conversion of Motion According to One Law into Motion According to Another Law, of which the following is a specification.

Mechanisms have been devised in which a driving member moved at a uniform velocity has been constructed and arranged to drive a pinion in such a manner that the rotation of the pinion is made in intermittent steps and its velocity is irregular. To satisfy the conditions appertaining to apparatus in which mechanisms of this character have been used, the rotary motion imparted to the pinion has consisted either of a small number of intermittent steps, or a short series of intermittent steps that recurs periodically, and for this purpose the driving member has consisted of an oscillating or rotating part having a race of teeth spaced unequally apart, and arranged in the form of a complete circle or a segment thereof. It may also be assumed that a race for this purpose has been employed having teeth arranged in a straight line.

It will be recognized that a race of segmental, circular, or straight form, while being suitable for producing either a small number of steps, or a series of steps recurring periodically, is not suitable if a long series of steps, varying in velocity in a nonrecurrent manner, are required to be produced, under conditions where the mechanism must necessarily be comparatively small or compact; and it is the object of this invention to provide improved apparatus for the conversion of motion according to one law into motion according to another law, in which there is employed a race or races of teeth adapted to be moved for imparting motion to a pinion or pinions, in such a manner that the motion produced varies as regards its velocity relative to that of the race or races in a non-recurrent manner as the driving proceeds, and in which the race or races is or are so formed and arranged that a greater extent of non-recurrent variable motion can be produced by mechanism of comparatively small size or compact form than is possible or convenient in practice, if a circular, segmental, or straight form of race was used.

According to this invention a race as provided has a large number of teeth spaced unequally apart, and consists of a number of convolutions, arranged, for example, in the form of a helix or spiral about the surface of a drum, cone or disk, or in the form of a ribbon adapted to be wound from one drum on to another, and a pinion as provided has a comparatively small number of teeth with which the teeth of the race engage occasionally and intermittently.

Apparatus according to this invention is specially applicable to such cases as the connection of two scales working past fixed pointers (or pointers working along fixed scales), one of the scales being of one type and the other scale of another type, when it is desired that the readings on the two scales will correspond at all times during the actuation of the mechanism; and the apparatus is adapted to be associated in construction with means for transmitting the indications of the converted motion to a distance.

It will be clear that if the projecting teeth of a race are equally spaced on the surface of a drum, associated with a first scale or its pointer, so as to gear continuously with the teeth of a pinion, geared directly to a second scale or its pointer, any relative motion of the first scale and pointer is merely reproduced on a magnified or diminished scale in the relative motion of the second scale and pointer. If the teeth of the race are equally spaced but with a gap between two consecutive teeth, the motion of the pinion will occur intermittently, but the general features of the law governing the motion of the first scale and pointer will be reproduced in the second scale and pointer. If, however, the teeth of the race are unequally spaced, a motion according to an entirely different law for the second scale and pointer, depending solely upon the positions in which the projecting teeth are placed, can be obtained.

Some examples of the construction of apparatus according to this invention will now be described with reference to the accompanying drawing, in which:—

Figures 1 and 2 are purely diagrammatic and introduced for convenience in describing the invention. Figs. 3 and 5 represent in elevation and plan, one method of constructing a mechanism according to our invention after the manner of Fig. 1, and Fig. 4 is an end view showing parts thereof to be described. Figs. 6 and 8 represent in elevation and plan, a mechanism according to our invention after the manner of Fig. 2, and Fig. 7 is an end view showing parts thereof to be described. In the various figures only a few of the teeth are shown. Figs. 9, 10 and 11 illustrate one form of locking mechanism.

In Fig. 1, 1 is a member indicated in the form of a rack with a race of teeth spaced unequally apart, and 2 is a pinion. The rack 1 if moved by hand or power would operate the pinion 2 intermittently, and the pinion 2 could be arranged to communicate its motion by ordinary gearing to a scale or its pointer. Thus if the rack 1 is moved by equal steps, the pinion 2 will move with unequal steps, the ratio of the motion depending upon the spacing of the teeth on the part of the race in action for the time being. Thus, for example, if the teeth of the races on the rack 1 are spaced in accordance with a reciprocal scale of ranges marked on the rack, the motion of the pinion will be by equal steps for equal increments of range.

In Fig. 2 the rack 1 is provided with two races of teeth spaced unequally apart, the two races operating intermittently two pinions 2 and 3 respectively, one of these pinions being directly geared to one scale or its pointer, the other being similarly geared to a second scale or its pointer. It will be seen that with the spacing of teeth shown, the velocity-ratios of the two pinions are very different when the rack 1 is on the extreme right or extreme left.

The pinion 2, or each of the pinions 2 and 3, has a comparatively small number of teeth.

In the example of construction according to this invention, conforming to the method explained with reference to Fig. 1, as illustrated in Figs. 3, 4 and 5, the member is made in the form of a drum 4, and the race is formed as a helical ridge projecting from the surface of the drum originally formed with a series of equally spaced teeth, certain of the teeth of which have been removed. This drum 4 is shown as being operated by a handle 5 and bevel gears 6 and 7. The pinion 2, provided with a flange 9 guided by a helical groove 10 in the drum 4, is feathered on a shaft 8. One scale or its pointer is geared directly to the handle 5 or drum 4, while the second scale or its pointer is geared directly to the shaft 8. It is unnecessary to show the scales and their pointers geared respectively to the handle 5 and shaft 8 as it will readily be seen that if the handle 5 is rotated uniformly, the shaft 8 will rotate at a certain rate when parts of the race from which no teeth have been removed are in mesh with pinion 2, whereas it will rotate intermittently and more slowly at other parts where teeth have been removed.

In the case above described the toothed drum 4 is operated continuously, whereas the pinion 2 is moved intermittently. For approximately accurate correspondence of two scales, since the intermittent motion imparted by the pinion 2 must necessarily be finite, it is imperative to reduce the motion of the pinion 2 by suitable gearing, and this implies that the length of the helical race upon the drum 4 shall be of sufficient length. In certain cases we may greatly reduce the length of the helical race and make the whole apparatus much less cumbersome by operating in a manner, conforming to the method explained with reference to Fig. 2, an example of which will now be described with reference to Figs. 6, 7 and 8. Here, however, the handle 5 is not directly geared to one of the scales or its pointer, but is used merely to rotate a double drum 4—14, through the bevel gearing 6—7. In this case two races are provided each formed as a helical ridge on the portions 4 and 14 of the double drum respectively. The function of the pinion 2, its flange 9, the helical groove 10, and the shaft 8, are just as before; in addition there is a pinion 12 corresponding to the pinion 2, a flange 19 corresponding to the flange 9, and a feathered shaft 18 corresponding to the shaft 8. The two scales or their pointers are in this case geared directly to the shafts 8 and 18 respectively. If we take as an illustration the conversion of the reciprocal scale of a rangefinder into a uniform scale, we may suppose the shaft 8 to be geared directly to the reciprocal scale and the shaft 18 to the uniform scale. In this case at the high ranges we require to give a large motion to the uniform scale and a very small motion to the reciprocal scale, and this may be accomplished by arranging that the pinion 12 shall be in continuous mesh with the teeth of the race on the drum 14, while the pinion 2 at the same moment is only in intermittent mesh with the teeth of the race on the drum 4. At low ranges the converse will hold, and the pinion 2 will be in continuous mesh with the teeth of the race on the drum 4, while the pinion 12 will be in intermittent mesh with the teeth of the race on the drum 14.

The two drums 4 and 14 need not be on one spindle, nor need they have equal motions. In some cases it may be convenient to arrange that the drums have different speeds of rotation.

Fig. 9 shows one method of locking the pinion 2 or 12 when intermittently not in mesh with the teeth of the race on the drum. Figs. 10 and 11 illustrate diagrammatically the principle of operation. In Fig. 9 there is shown an additional drum 24, say, a prolongation of the drum 14. Corresponding to every tooth 20 of the race upon the drum 14 there is a gap 21 upon a ridge on the drum 24, except at those parts where the pinion is in continuous mesh when the ridge may be removed, and at every place such as 22 where there is a gap between the teeth on the drum 14 there is a ridge 23 upon the drum 24. Thus a tooth upon 14 corresponds to a gap upon 24, and a gap upon 14 to a ridge upon 24. Gearing into the drum 14 is, as before, a pinion 12 feathered upon a shaft 18, and in association with the drum 24 is a toothed wheel 32 also feathered upon the shaft 18 (or fixed to the pinion 12 so that the pinion 12 and the toothed wheel 32 always rotate through the same angle). So as not to confuse Fig. 9, the pinions 12 and the toothed wheel 32 and shaft 18 are not shown, but the method of working is clearly shown diagrammatically so far as pinion 12 is concerned in Fig. 10, and so far as toothed wheel 32 is concerned in Fig. 11. It will be understood that the pinion 12 in Fig. 10 and the toothed wheel 32 in Fig. 11 are upon the same shaft or geared together, and it is only for convenience of illustration that Fig. 11 is shown placed below Fig. 10. From these figures it will also be seen that the teeth of the toothed wheel 32 correspond to the gaps between the teeth of the pinion 12. In the position shown in Figs. 10 and 11, the pinion 12 is locked because the toothed wheel 32 is prevented from turning by the ridge 23. As the drums 14 and 24 are moved simultaneously to the left, the tooth 20 moves pinion 12 one tooth, while a tooth of the toothed wheel 32 enters the gap 21. The pinion 12 is thus prevented from turning when it is in a position upon the race or drum when it would otherwise be uncontrolled.

Provision may otherwise be made for preventing the motion of the pinion 2 or 12 at times when its teeth are not in mesh, for example, we may arrange to have sufficient resistance to the motion of the pinion 2 or 12 to prevent its moving at times when otherwise uncontrolled.

In the special case where it is desired to transmit the indications of a rangefinder to a distance by electrical or other appropriate means, it is only necessary to gear an appropriate type of transmitting mechanism to the shaft 8 (Fig. 3) or 18 (Fig. 6) since a given angle of rotation of this shaft may be made to correspond to a definite change of range. Similarly other types of indications represented by the motion of a pinion, such as 2 or 12, may be transmitted electrically or otherwise according to the purpose for which the apparatus is designed.

We claim:—

1. A race adapted to have imparted to it motion according to one law provided with a large number of teeth spaced unequally apart and consisting of a number of convolutions, and a pinion having a comparatively small number of teeth, the race being adapted to be moved and in progress its teeth caused to engage occasionally and intermittently with teeth of the pinion and impart to the pinion motion according to another law, for the purposes set forth.

2. A race adapted to have imparted to it motion according to one law provided with a large number of teeth spaced unequally apart arranged in the form of convolutions about the surface of a part adapted to be rotated, in combination with a pinion having a comparatively small number of teeth and means for guiding the pinion so that as the race is moved the teeth of the race are caused to engage occasionally and intermittently with teeth of the pinion and impart to the pinion motion according to another law, for the purposes set forth.

3. A race adapted to have imparted to it motion according to one law provided with a large number of teeth spaced unequally apart arranged in the form of convolutions about the circular surface of a part adapted to be rotated, in combination with a pinion having a comparatively small number of teeth and means for guiding the pinion so that as the race is moved the teeth of the race are caused to engage occasionally and intermittently with teeth of the pinion and impart to the pinion motion according to another law, for the purposes set forth.

4. A race adapted to have imparted to it motion according to one law provided with a large number of teeth spaced unequally apart arranged in the form of a helix about the surface of a part adapted to be rotated, in combination with a pinion having a comparatively small number of teeth and means for guiding the pinion so that as the race is moved the teeth of the race are caused to engage occasionally and intermittently with teeth of the pinion and impart to the pinion motion according to another law, for the purposes set forth.

5. A race adapted to have imparted to it motion according to one law provided with a large number of teeth spaced unequally apart arranged in the form of convolutions about the circular surface of a part adapted to be rotated, a pinion having a comparatively small number of teeth mounted capable of rotation and axial travel and engaged by the teeth of the race and have imparted to it motion according to another law, and a guide conforming to the convolutions of the race for moving the pinion axially, for the purposes set forth.

6. A pinion having a comparatively small number of teeth, a race provided with a large number of teeth spaced unequally apart and consisting of a number of convolutions, in combination with means for preventing the rotation of the pinion when not in mesh with the teeth of the race, for the purposes set forth.

WILLEM ANNE MOUTON.
ARCHIBALD BARR.
WILLIAM STROUD.

Witnesses:
ROBERT ALLAN,
JOHN HERBERT WRIGHT.

Copies of this patent may be obtained for five cents each, by addressing the "Commissioner of Patents, Washington, D. C."